US009445319B2

(12) United States Patent
Choi et al.

(10) Patent No.: US 9,445,319 B2
(45) Date of Patent: Sep. 13, 2016

(54) METHOD AND APPARATUS FOR CONTROLLING AND RESOLVING A HANDOVER FAILURE WHEN A DYNAMIC CELL OFF IS OCCURRED IN WIRELESS ACCESS SYSTEM

(71) Applicant: LG ELECTRONICS INC., Seoul (KR)

(72) Inventors: Hyeyoung Choi, Seoul (KR); Jaehoon Chung, Seoul (KR); Eunjong Lee, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 14/181,200

(22) Filed: Feb. 14, 2014

(65) Prior Publication Data

US 2014/0226621 A1 Aug. 14, 2014

Related U.S. Application Data

(60) Provisional application No. 61/765,017, filed on Feb. 14, 2013.

(51) Int. Cl.
*H04W 36/00* (2009.01)

(52) U.S. Cl.
CPC .............................. *H04W 36/0061* (2013.01)

(58) Field of Classification Search
CPC ................................................ H04W 36/0061
See application file for complete search history.

(56) References Cited

U.S. PATENT DOCUMENTS

| | | | | |
|---|---|---|---|---|
| 2009/0238141 A1* | 9/2009 | Damnjanovic | ... | H04W 36/0055 370/331 |
| 2011/0244870 A1* | 10/2011 | Lee | ...... | H04W 52/244 455/444 |
| 2013/0070685 A1* | 3/2013 | Yi | .......... | H04W 52/54 370/328 |
| 2014/0016534 A1* | 1/2014 | Kim | .................. | H04W 74/0833 370/312 |
| 2014/0211763 A1* | 7/2014 | Choi | ..................... | H04W 36/20 370/332 |

* cited by examiner

*Primary Examiner* — Jianye Wu
(74) *Attorney, Agent, or Firm* — Lee, Hong, Degerman, Kang & Waimey; Jonathan Kang; Michael Monaco

(57) ABSTRACT

A method and device for preventing a handover failure by a user equipment (UE) in a wireless access system supporting cell-on/off. The method includes: initiating, by a user equipment (UE), a handover procedure to a target Base Station (BS); receiving, by the UE, cell off indication information indicating that a cell of the target BS will be powered off during the handover procedure; and discontinuing, by the UE, the handover procedure according to the cell off indication information.

14 Claims, 9 Drawing Sheets

(a) Contol - plane protocol stack (b) User - plane protocol stack

MeNB : macro eNodeB    MUE : macro UE
PeNB : pico eNodeB     PUE : pico UE
FeNB : femto eNodeB    FUE : femto UE Peak traffic situation          Off-peak traffic situation
(a)                             (b)

(a)

(b)

(c)

METHOD AND APPARATUS FOR CONTROLLING AND RESOLVING A HANDOVER FAILURE WHEN A DYNAMIC CELL OFF IS OCCURRED IN WIRELESS ACCESS SYSTEM

CROSS-REFERENCE TO RELATED APPLICATIONS

Pursuant to 35 U.S.C. §119(e), this application claims the benefit of U.S. Provisional Patent Application No. 61/765,017, filed on Feb. 14, 2013, the contents of which are hereby incorporated by reference herein in its entirety.

BACKGROUND OF THE INVENTION

1. Field of the Invention

The present invention relates to a wireless access system, and more particularly, to methods and apparatus for controlling and resolving a handover failure when a dynamic cell off is occurred during a handover procedure.

2. Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

SUMMARY OF THE INVENTION

An object of the present invention is to provide a method for efficiently managing the power of a cell by powering on and/or off the cell.

Another object of the present invention is to provide a method for resolving a handover failure, when a cell is dynamically powered on or off.

Another object of the present invention is to provide apparatuses supporting the methods.

The objects achieved by the present invention are not limited to the above-described objects and those skilled in the art may consider other objects from the following description of the embodiments of the present invention.

The present invention provides methods and apparatus for controlling and resolving a handover failure when a dynamic cell off is occurred during a handover procedure.

In one aspect of the present invention, a method for preventing a handover failure in a wireless access system supporting cell-on/off includes initiating a handover procedure to a target Base Station (BS) by a User Equipment (UE), receiving cell off indication information indicating that a cell of the target BS will be powered off by the UE, and discontinuing the handover procedure according to the cell off indication information by the UE.

In another aspect of the present invention, a UE for preventing a handover failure in a wireless access system supporting cell-on/off includes a receiver, a transmitter, and a processor configured to support prevention of a handoff failure. The processor initiates a handover procedure to a target Base Station (BS) by controlling the transmitter and the receiver, receives cell off indication information indicating that a cell of the target BS will be powered off by controlling the receiver, and discontinues the handover procedure according to the cell off indication information.

The cell off indication information may be indicated by a backoff indicator field included in a Medium Access Control (MAC) header of a random access response message transmitted by the target BS.

Or the cell off indication information may be indicated by one of a reserved field included in a MAC header and a reserved field included in MAC payload of a random access response message transmitted by the target BS.

Or the cell off indication information may be indicated by a channel state information request field included in an uplink grant of MAC payload of a random access response message transmitted by the target BS.

Or the cell off indication information may be indicated by at least one of a logical channel identifier included in a header of a contention resolution message transmitted by the target BS and a UE contention resolution identifier included in payload of the contention resolution message.

Or the cell off indication information may be indicated by a reserved field included in a header of a contention resolution message transmitted by the target BS and a reserved field included in payload of the contention resolution message.

Or the cell off indication information may be received from a source BS by higher layer signaling.

The above aspects of the present invention are merely a part of preferred embodiments of the present invention. Therefore, those skilled in the art will understand that various embodiments reflecting the technical features of the present invention can be derived and understood based on the following detailed description of the present invention.

According to the embodiments of the present invention, the following effects are obtained.

The power of a cell can be efficiently managed by small cell on/off.

When a handover failure occurs due to dynamic cell on/off in an environment to which small cells are introduced, the handover failure can be resolved effectively.

The effects of the present invention are not limited to the above-described effects and other effects which are not described herein will be understood by those skilled in the art from the following description of the embodiments of the present invention. That is, unintended effects of the present invention may be also derived by those skilled in the art from the embodiments of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
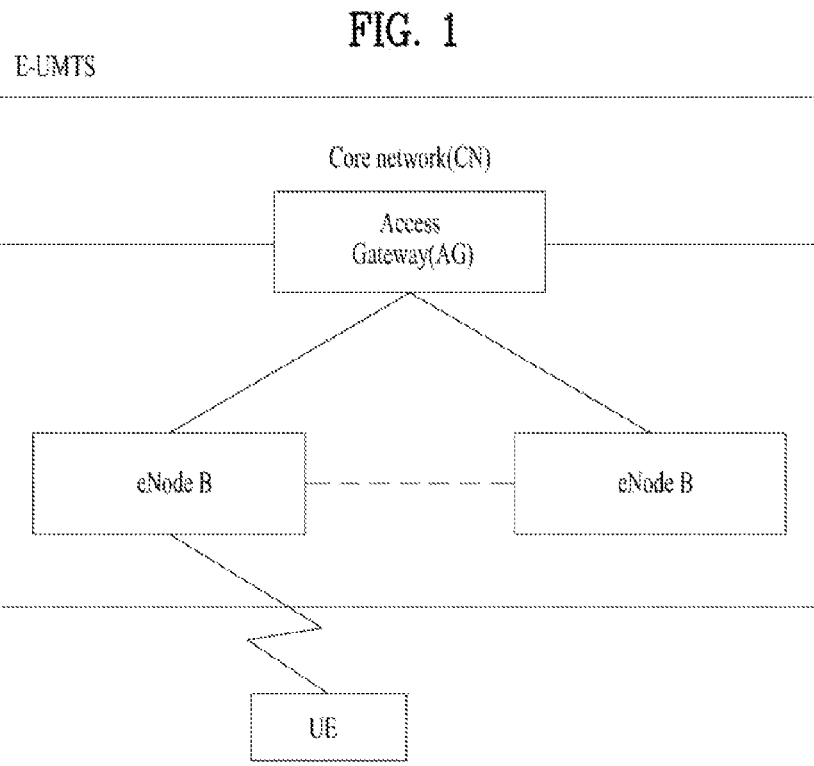
FIG. 1 illustrates a schematic structure a network structure of an evolved universal mobile telecommunication system (E-UMTS)

The present invention provides methods and apparatus for controlling and resolving a handover failure when a dynamic cell off is occurred during a handover procedure.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

The embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or network nodes other than the base station. The term "Base Station (BS)" may be replaced with the terms fixed station, Node-B, eNode-B (eNB), advanced base station (ABS), a macro cell, a small cell, or access point as necessary.

The term "terminal" may also be replaced with the term user equipment (UE), mobile station (MS), subscriber station (SS), mobile subscriber station (MSS), mobile terminal or advanced mobile station (AMS) as necessary.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the $3^{rd}$ generation partnership project (3GPP) system, the 3GPP LTE system and the 3GPP2 system, all of which are wireless access systems. In particular, the embodiments of the present invention are supported by the standard documents such as the 3GPP TS 36.211, TS 36.212, TS 36.213, TS 36.321 and/or 3GPP TS 36.331, all of which are the standard documents of the 3GPP LTE system. That is, the steps or the portions of the embodiments of the present invention which are not described in order to clarify the technical spirit are supported by the above-described documents. All the terms disclosed in the present specification may be described by the above-described standard documents.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like.

CDMA may be embodied with radio technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with radio technology such as Institute of Electrical and Electronics Engineers (IEEE) 802.11 (Wi-Fi), IEEE 802.16 (WiMax), IEEE 802-20, and E-UTRA (Evolved UTRA).

The UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. For clarity, the following description focuses on 3GPP LTE and LTE-A. However, the present invention is also applicable to an IEEE 802.16e/m system.

1. 3GPP LTE/LTE-A System

Hereinafter, 3GPP LTE (3rd Generation Partnership Project Long Term Evolution; hereinafter called "LTE") system which is one of mobile communication systems is described.

1.1 General LTE System

FIG. 1 illustrates a schematic structure a network structure of an evolved universal mobile telecommunication system (E-UMTS).

An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs. A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
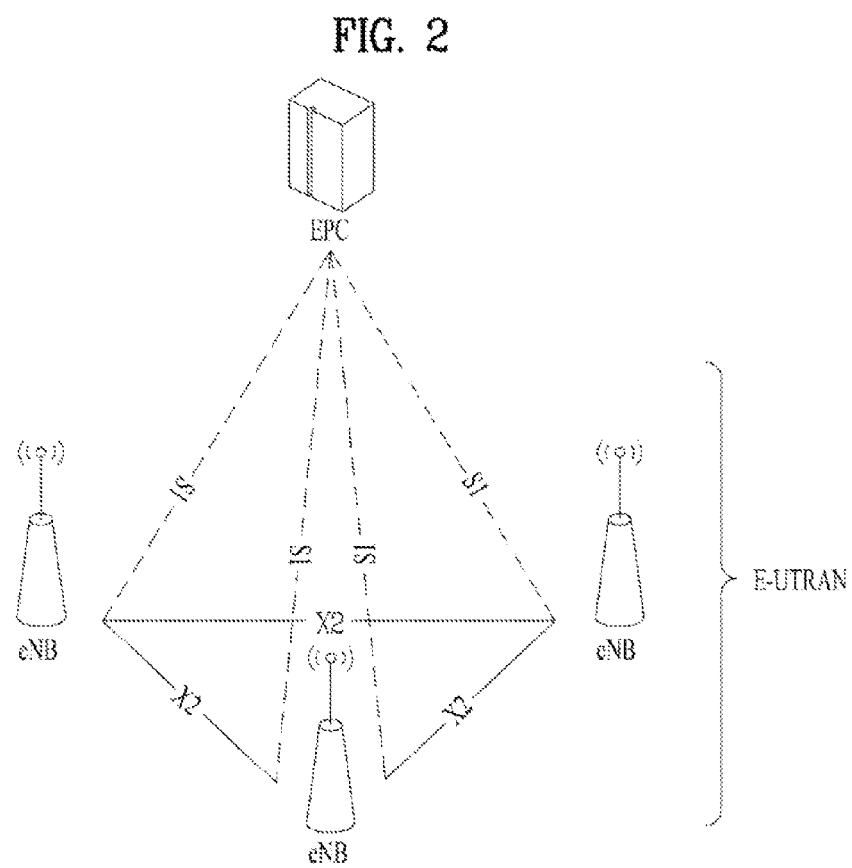
FIG. 2 illustrates a schematic structure of an Evolved Universal Terrestrial Radio Access Network (E-UTRAN)

FIG. 2 illustrates a network structure of an Evolved Universal Terrestrial Radio Access Network (E-UTRAN) system.

The E-UTRAN system is an evolved version of the conventional UTRAN system. The E-UTRAN includes base stations that will also be referred to as "eNode Bs" or "eNBs". The eNBs are connected through X2 interfaces. The X2 user plane interface (X2-U) is defined between eNBs. The X2-U interface provides non guaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipments (UEs) through a radio interface and is connected to an Evolved Packet Core (EPC) through an S1 interface. The S1 user plane interface (S1-U) is defined between the eNB and the S-GW. The S1-U interface provides non guaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like.

Figure 3:
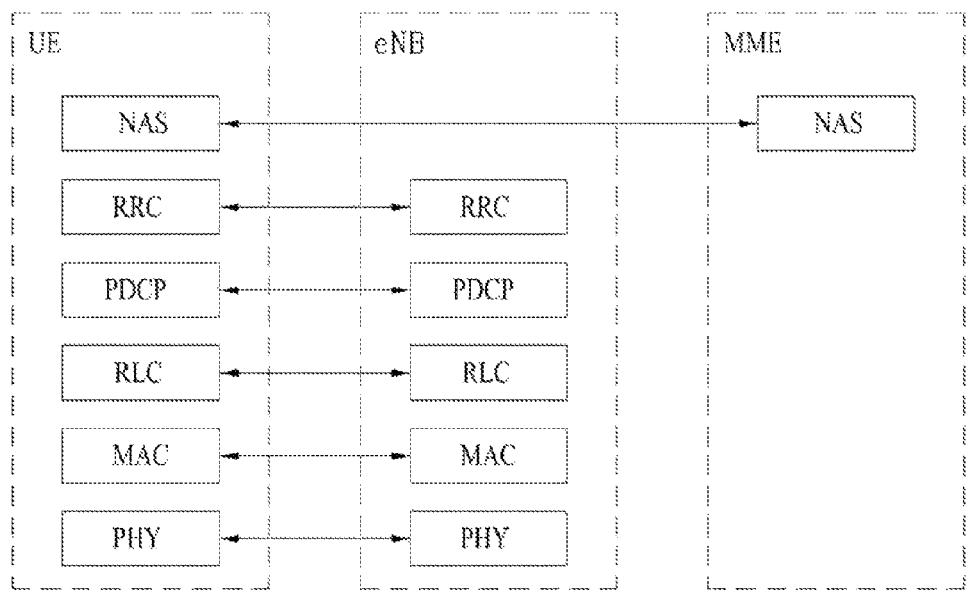
FIG. 3 illustrates the configurations of a radio interface protocol between the E-UTRAN and a UE.
Figure 3:
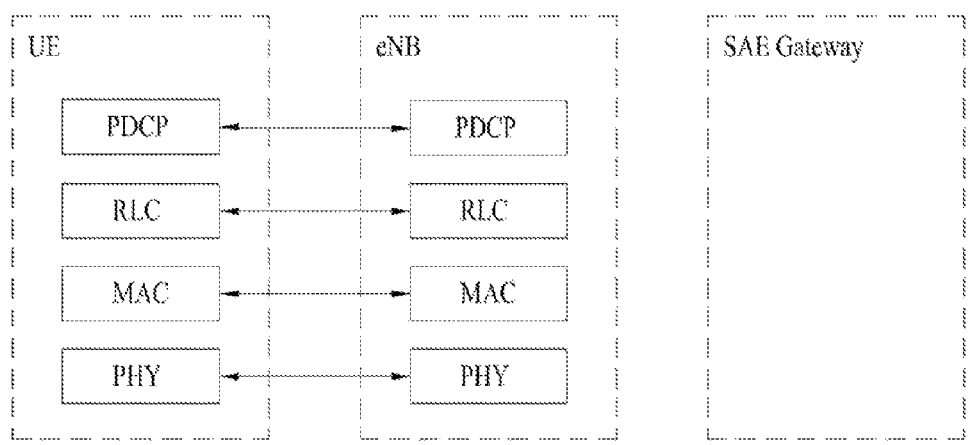

FIG. 3 illustrates the configurations of a control plane and a user plane of a radio interface protocol between the E-UTRAN and a UE based on the 3GPP radio access network standard.

The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

1.2 Heterogeneous Network Deployment

Figure 4:
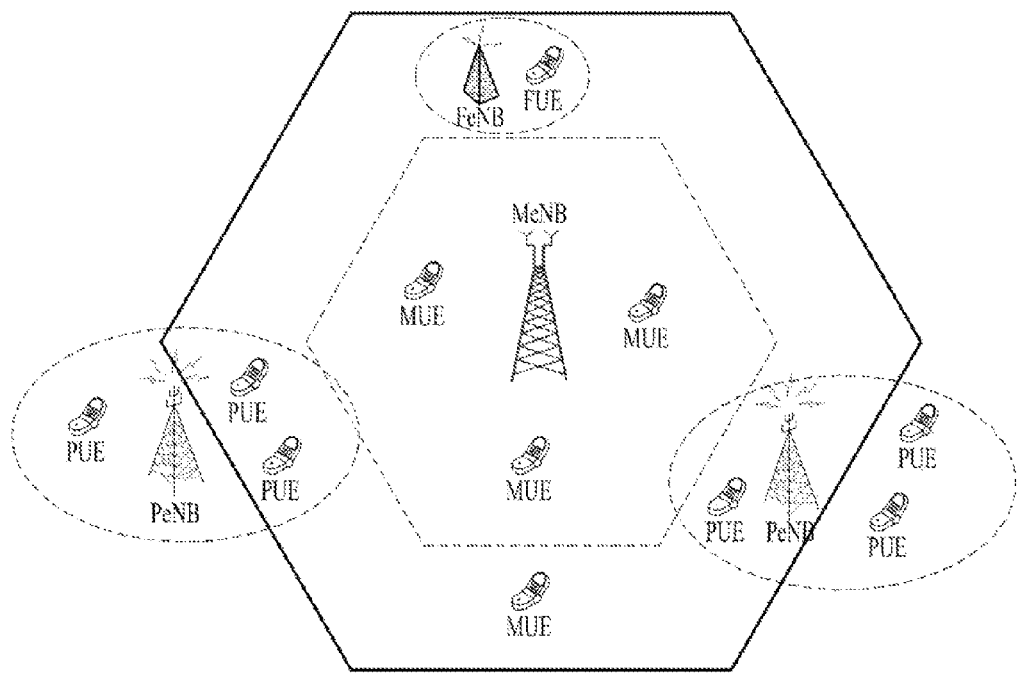
FIG. 4 illustrates an exemplary heterogeneous network deployment.

FIG. 4 illustrates an exemplary heterogeneous network deployment.

In order to guarantee data service such as multimedia service, etc. more stably in a future-generation mobile communication system, more interest has been attracted to a hierarchical cell structure or heterogeneous cell structure in which micro cells, pico cells, and/or femto cells for low-power/short-range communication coexist in a macro cell-based homogeneous network.

This is because deployment of additional macro cells is inefficient in terms of cost and complexity with respect to the increase of system performance. A heterogeneous network structure illustrated in FIG. 4 is under consideration in the present communication networks.

In FIG. 4, an eNB that manages and covers a macro cell is defined as a Macro eNB (MeNB) and a UE operating in the macro cell of an MeNB is defined as a Macro UE (MUE). In addition, an eNB that manages and covers a pico cell is referred to as a Pico eNB (PeNB) and a UE scheduled in the pico cell of a PeNB is referred to as a Pico UE (PUE). An eNB that manages and covers a femto cell is referred to as a Femto eNB (FeNB) and a UE scheduled by an FeNB is referred to as a Femto UE (FUE).

Referring to FIG. 4, a plurality of micro cells may coexist in one macro cell. The micro cells are allocated resources according to a cell coordination scheme and service UEs using the allocated resources. These micro cells are divided into two types according to access schemes.

(1) Open access Subscriber group (OSG): an OSG-type micro cell allows access of existing macro UEs or other micro UEs. A UE may perform handover to an OSG-type micro cell or a macro cell. OSG may also be called Non-Close access Subscriber Group (NCSG).

(2) Close access Subscriber Group (CSG): a CSG-type micro cell does not allow access of existing macro UEs or other micro UEs without authentication. Thus a UE may not perform handover to a CSG-type micro cell or a macro cell.

1.3 Energy Saving (ES)

Protecting the environment and combating climate change are challenges that we face today. In the telecom environment, as energy prices increase, there is added incentive for Network Operators to look for means to reduce energy costs.

OAM (Open & Maintenance) of mobile networks can contribute to energy saving by allowing the operator to set policies to minimize consumption of energy, while maintaining coverage, capacity and quality of service. The permitted impact on coverage, capacity and quality of service is determined by operator's policy.

When a cell is in energy saving states, it may need neighboring cells to pick up the load. However a cell in Energy Saving state cannot cause coverage holes or create undue load on the surrounding cells. All traffic on that cell is expected to be drained to other overlaid/umbrella cells before any cells moves to Energy Saving state.

A cell in Energy Saving state is not considered a cell outage or a fault condition. No alarms should be raised to the IRP Manager for any condition that is a consequence of a UE moving into Energy Saving state. In addition, the use of the renewable energy sources (e.g. wind, solar energy) should be encouraged in mobile networks.

The following ESM concepts can apply to different RATs, e.g. UMTS and LTE/LTE-A system. Nevertheless some of these ESM concepts may be limited to specific RATs and network elements, and specific solutions may be required for them.

Figure 5:
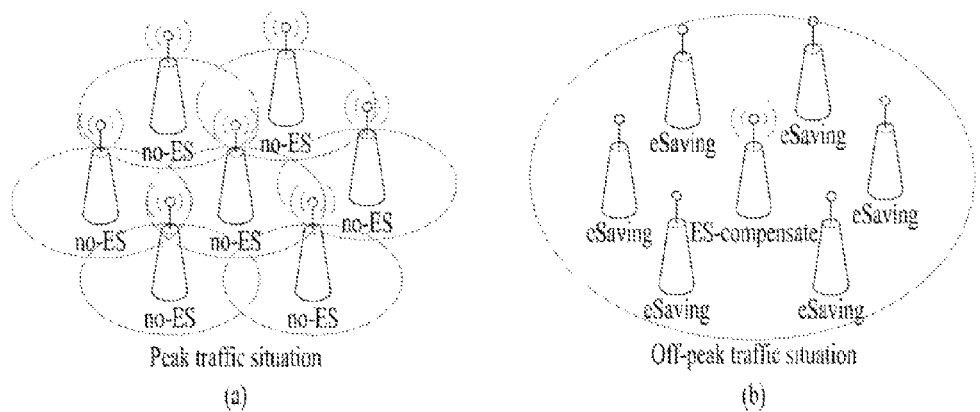
FIG. 5 illustrates network arrangements corresponding to capacity demand variation for energy saving purposes.

FIG. 5 illustrates network arrangements corresponding to capacity demand variation for energy saving purposes. Especially, FIG. 5(a) shows a pack traffic situation and FIG. 5(b) shows an off-peak traffic situation.

Referring to FIG. 5, the coverage area of a cell can be configured dynamically, where an operator would employ smaller coverage areas per cell (to increase capacity per geographic area) in a peak traffic situation. In that case some base stations would be enabled to adjust their transmission power and other configuration parameters for their cells at off-peak times in order to provide coverage for other neighboring cells—which could then be transferred to energy saving state, after handing currently associated UEs over to remaining neighboring cells.

Activating energy saving on certain base stations and modifying radio parameters for increasing coverage for other cells can lead to different neighbor relations as well as different cell and frequency layouts, which should be addressed by automatic neighbor relation, interference control, e.g. through OAM-driven configuration or SON functions, depending on the specific RAT in use. Depending on the specific scenarios, activating energy saving on base stations could ultimately lead to switching off all radio-transmission-related functions at a site, which would lead to reduced energy consumption and could implicitly lead to even further energy saving, e.g. when air condition systems at a site adapt to the reduced cooling requirements—which is not considered here in detail.

The energy saving management in the scenario would ideally lead to situation for an off-peak time as depicted in FIG. 5—where one base station would remain powered one (depicted as ES-Compensate), taking over the coverage areas of neighbor base stations in Energy Saving state (depicted as eSaving).

As another network arrangement, we can consider an eNB overlaid use base. In order to assure the service connectivity and make no side effect on the service (there is a possible case that a UE may power on in the area of an eNB in ES), only the eNB overlaid by other eNBs (i.e. the area served by the eNB also covered by other eNBs) can enter into ES.

In this scenario, legacy systems (e.g. 2G/3G systems) provide radio coverage together with E-UTRAN. Another case similar with this is that an area covered by different frequencies in E-UTRAN, i.e. inter-frequency case.

According to the definition of base station classes, base stations can be categorized by Macro Cell (Wide Area Base Station), Micro Cell (Medium Range Base Station), Pico Cell (Local Area Base Station) and Femto Cell (characterized by Home Base Station). This category of base station can be applied to enhance the scenarios of inter-frequency eNB overlaid.

1.4 A Handover Procedure

Figure 6:
FIG. 6 illustrates a handover preparation procedure.

FIG. 6 illustrates a handover preparation procedure.

Referring to FIG. 6, the Source eNB (SeNB) initiates a handover procedure by sending the HANDOVER REQUEST message to the Target eNB (TeNB). When the source eNB sends the HANDOVER REQUEST message, it shall start the timer $T_{RELOCprep}$ (S610).

If the TeNB is able to support the handover request from the SeNB, the TeNB shall reserve necessary resources, and send the HANDOVER REQUEST ACKNOWLEDGE message back to the SeNB (S620).

The TeNB shall include the E-RABs for which resources have been prepared at the target cell in the E-UTRAN Radio Access Bearers (E-RABs) Admitted List IE. The TeNB shall include the E-RABs that have not been admitted in the E-RABs Not Admitted List IE with an appropriate cause value.

Figure 7:
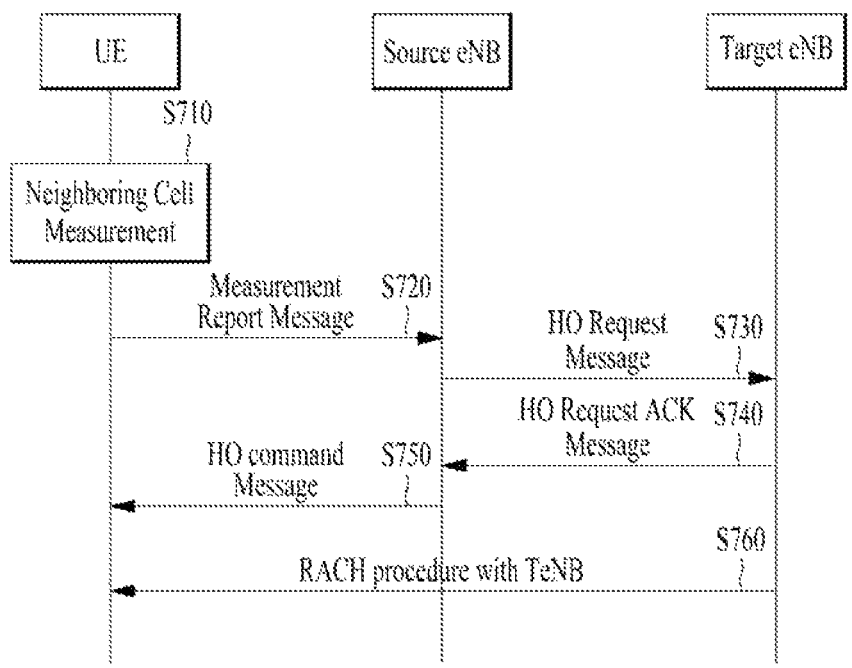
FIG. 7 illustrates an exemplary handover procedure.

FIG. 7 illustrates an exemplary handover procedure.

In embodiments of the present invention, an eNB supporting a source cell that is servicing a UE is referred to as an SeNB and an eNB supporting a serving cell to which the UE is to perform handover is referred to as a TeNB. The TeNB may be a micro/femto/pico eNB that supports a small cell. The SeNB may also be a micro/femto/pico eNB.

It is assumed that the UE is RRC_Connected mode with the SeNB. Therefore, the mobility of the UE is controlled by the SeNB. Referring to FIG. 7, the UE performs neighbor cell measurement for handover, cell addition, or cell reselection (S710).

That is, the UE measures the radio channel states of a source cell and a neighbor cell and transmits a Measurement Report message including the measurements to the SeNB (S720).

Upon receipt of the Measurement Report message for handover from the UE, the SeNB transmits a HandOver (HO) Request message to a target cell to which the UE is to perform handover, in order to initiate a handover procedure (S730).

When a TeNB acknowledges the handover, the TeNB transmits an HO Request ACK message in response to the HO Request message to the serving cell (S740).

Then the SeNB transmits an HO Command message to the UE and the UE starts the handover procedure to the TeNB (S750).

Thus, the UE may acquire uplink synchronization to the TeNB and perform Timing Advance (TA) with the TeNB by performing a random access procedure to the TeNB (S760).

In the neighbor cell measurement step S710, the UE may measure the following three types of measurements.

(1) Reference Signal Received Power (RSRP): an RSRP may be acquired by measuring the magnitude of a cell-specific downlink reference signal. That is, the RSRP is the received power value of a desired signal received from a serving cell.

(2) Received Signal Strength Indicator (RSSI): an RSSI is a total reception power value of a signal received at a UE. The RSSI is a measurement including the interference and reception noise power of neighbor cells as well as the power of a desired signal.

(3) Reference Signal Received Quality (RSRQ): RSRQ=N·RSRP/RSSI where N is the number of Resource Blocks (RBs) in a corresponding bandwidth, when the RSSI is measured.

Now a description will be given of the random access procedure performed in step S760.

1.5. Random Access Procedure

Figure 8:
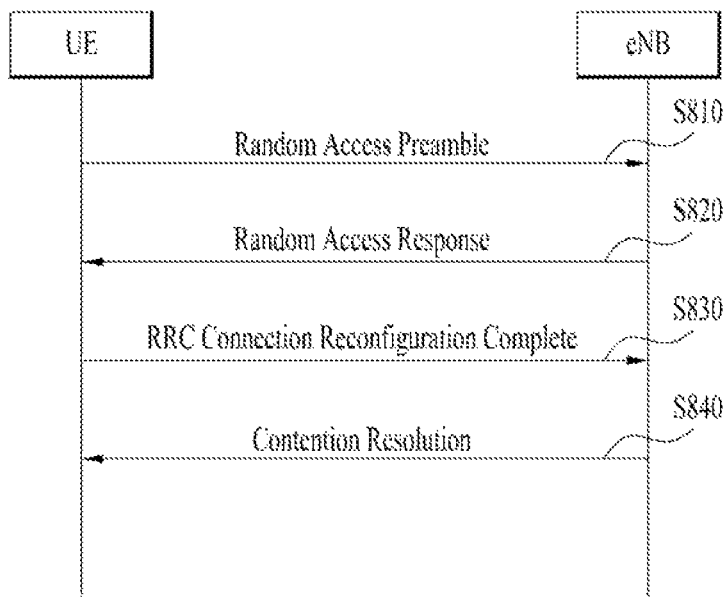
FIG. 8 illustrates an operation performed between a User Equipment (UE) and a evolved Node B (eNB) in a contention-based random access procedure.

FIG. 8 illustrates an operation performed between a UE and an eNB in a contention-based random access procedure.

(1) Transmission of First Message (Msg1)

The UE may randomly select a Random Access Preamble from a set of Random Access Preambles indicated by system information or a Handover Command message, select Physical RACH (PRACH) resources, and transmit the selected Random Access Preamble in the PRACH resources to the eNB (S810).

(2) Reception of Second Message (Msg2)

After transmitting the random access preamble in step S810, the UE attempts to receive a Random Access Response (RAR) message within a random access response reception window indicated by the system information or the Handover Command message from the eNB (S820).

The RAR message may be transmitted in a Medium Access Control (MAC) Packet Data Unit (PDU) and the MAC PDU may be transmitted on a PDSCH in step S820. To receive information on the PDSCH successfully, the UE preferably monitors a Physical Downlink Control Channel (PDCCH).

The PDCCH may deliver information about a UE to receive the PDSCH, time and frequency information about radio resources of the PDSCH as resource allocation information, and information about the transport format of the PDSCH. Once the UE successfully receives the PDCCH directed to it, the UE may appropriately receive an RAR on the PDSCH based on information of the PDCCH. The RAR may include a Random Access Preamble Identifier (RAPID), an UpLink (UL) Grant indicating UL radio resources, a Temporary Cell-Radio Network Temporary Identifier (C-RNTI), and a Timing Advance Command (TAC).

The reason for including the RAPID in the RAR is that one RAR may include RAR information for one or more UEs and thus it is necessary to indicate a UE for which the UL Grant, the Temporary C-RNTI, and the TAC are valid. Herein, it is assumed that the UE selects an RAPID matching the Random Access Preamble selected by the UE.

(3) Transmission of Third Message (Msg 3)

If the UE receives an RAR message valid for it, the UE processes information included in the RAR message. That is, the UE applies a RAC and stores the Temporary C-RNTI. In addition, the UE may store data to be transmitted in response to the valid RAR reception in an Msg 3 buffer.

Meanwhile, the UE transmits data (i.e. a third message) to the eNB based on the received UL Grant. That is, the UE transmits a third message in UL resources allocated by the UL Grant to the eNB (S830).

The third message should include an ID of the UE. In the contention-based random access procedure, the eNB may not determine which UE is performing the random access procedure and should identify the UE to resolve collision later. The third message may be an RRC Connection Request message or an RRC Connection Reconfiguration Complete message.

(4) Reception of Fourth Message

After transmitting the data including its ID based on the UL Grant included in the RAR, the UE receives a Contention Resolution message on a DL-SCH from the eNB (S840).

From the perspective of the physical layer, a Layer 1 (L1) random access procedure refers to transmission and reception of a Random Access Preamble and an RAR message in steps S810 and S820. The other messages are transmitted on a shared data channel by a higher layer, which is not considered to fall into the L1 random access procedure.

In the above RACH procedure, an RACH includes 6 RBs in one or more contiguous subframes reserved for transmission of a Random Access Preamble. The L1 random access procedure is triggered by a preamble transmission request from a higher layer. A preamble index, a target preamble reception power PREAMBLE_RECEIVED_TARGET_

POWER, a matching RA_RNTI, and PRACH resources are part of the preamble transmission request, indicated by the higher layer.

Preamble transmission power $P_{PRACH}$ is calculated by [Equation 1].

$$P_{PRACH} = \min\{P_{CMAX,c}(i), \text{PREAMBLE\_RECEIVED\_TARGET\_POWER} + PL_c\}\_[dBm] \quad \text{[Equation 1]}$$

In [Equation 1], $P_{CMAX,c}(i)$ is transmission power defined for subframe i of a Primacy Cell (PCell) and $PL_c$ is an estimate of a DL pathloss of the PCell for the UE.

A preamble sequence is selected from a preamble sequence set, using a preamble index. A single preamble is transmitted in PRACH resources indicated by the transmission power $P_{PRACH}$ using the selected preamble sequence.

Detection of a PDCCH indicated by the RA-RNTI is attempted within a window controlled by the higher layer. If the PDCCH is detected, a corresponding DL-SCH transport block is transmitted to the higher layer. The higher layer analyzes the transport block and indicates a 20-bit UL Grant.

Figure 9:
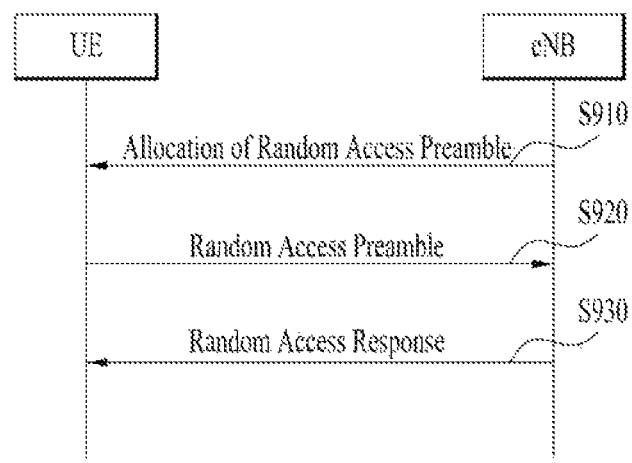
FIG. 9 illustrates an operation between a UE and an eNB in a non-contention-based random access procedure.

FIG. 9 illustrates an operation between a UE and an eNB in a non-contention-based random access procedure.

Compared to the contention-based random access procedure illustrated in FIG. 8, the non-contention-based random access procedure ends simply by transmitting the first and second messages. However, before a UE transmits a Random Access Preamble to an eNB, the eNB allocates the Random Access Preamble to the UE. Then the UE transmits the Random Access Preamble as the first message to the eNB and receives an RAR from the eNB. Thus, the random access procedure ends.

The non-contention-based random access procedure may be performed in the event of handover or upon request by a command from an eNB. In both cases, the contention-based random access procedure may also be performed.

Referring to FIG. 9, the eNB allocates a dedicated Random Access Preamble free of collision to the UE, for the non-contention-based random access procedure. For example, the eNB may indicate the Random Access Preamble by a Handover Command or a PDCCH Command (S910).

The UE transmits the allocated dedicated Random Access Preamble as the first message to the eNB and receives an RAR message in response to the Random Access Preamble from the eNB. RAR information is received in the same manner as in the contention-based random access procedure illustrated in FIG. 8 (S920 and S930).

2. Dynamic Cell On/Off Procedures

In embodiments of the present invention, a cell defined as a source cell and/or a target cell may refer to an area covered by an eNB and may be interchanged with an eNB in the same sense. In a wireless communication environment supporting Carrier Aggregation (CA) that aggregates one or more Component Carriers (CCs), a cell may be one CC. A cell may include a DL carrier and/or a UL carrier. In the CA environment, an eNB may cover one or more cells.

A network system may power on or off a cell for the purpose of ES or interference coordination/cancelation. For example, a network load state is different at a specific time in a specific place and a signal (e.g. a synchronization signal and a reference signal) transmitted from a cell with no load interferes with neighbor cells, consuming energy. Therefore, if a cell has a small load or no load, the cell may be powered off for the purpose of ES and interference coordination/cancelation.

"Power-off" of a cell may cover complete power-off of specific functions or network elements of the cell and restriction of use of resources of the cell. Embodiments of the present invention are not limited by the power-off range of a cell.

If a cell is powered off in functional terms, the cell may discontinue both DL signal transmission and UL signal reception or may perform only one of UL signal reception and DL signal transmission. Or the cell may perform DL signal transmission without UL signal reception. In embodiments of the present application, a cell may be powered off irrespective of DL/UL signal transmission/reception. A cell may be nay of a macro cell and a small cell (e.g., micro cell, pico cell, femto cell, etc.) in embodiments of the present application.

It is difficult for a UE in an RRC_CONNECTED mode, which performs the handover procedure illustrated in FIG. 1 to know a change in the state of a dynamically powered-on/off target cell. If the target cell managed by a TeNB is powered off, the UE does not know the state of the TeNB because no connection has been established between the UE and the TeNB. Accordingly, the UE may continue the handover procedure even though the TeNB will be powered off.

That is, since the UE performs handover to the powered-off TeNB, the handover will be failed. For example, although the UE performs a random access procedure to the TeNB as a part of the handover procedure, the UE does not receive a response from the TeNB. As a result, a handover failure may occur.

If the handover failure occurs in the RACH procedure, the UE should repeat the RACH procedure a predetermined number of times, thus increasing power consumption. Moreover, a UL signal (e.g., a Random Access Preamble, etc.) that the UE continues to transmit may interfere with other UEs and/or an eNB. Accordingly, if the target cell of the TeNB is powered off, the UE needs to reduce meaningless RACH processes.

Hereinafter, a detailed description will be given of various methods for resolving a handover failure of a UE that performs a handover procedure to a target cell of a TeNB, when the target cell is powered off.

3. Handover Failure Resolution Methods

Figure 10:
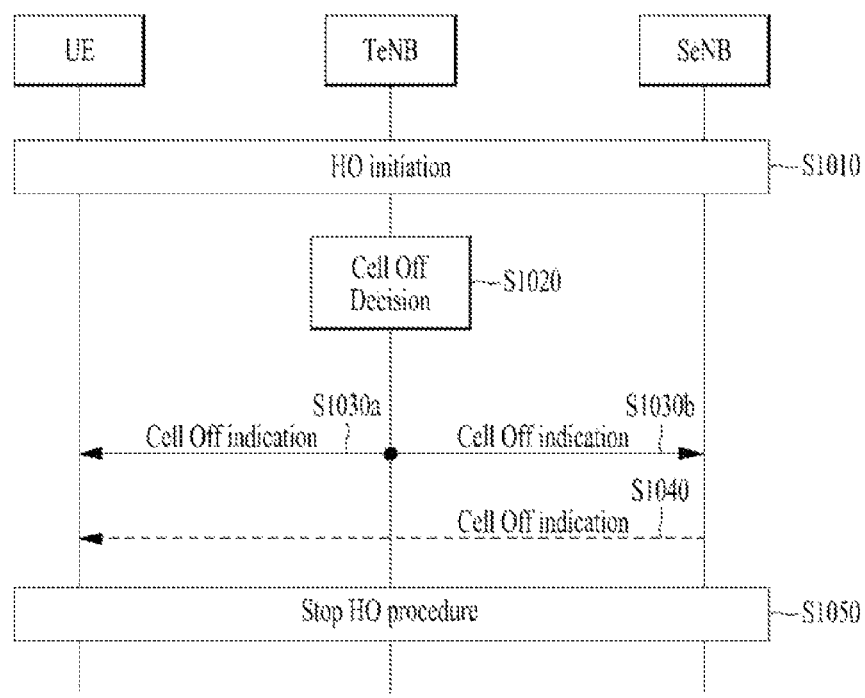
FIG. 10 illustrates one of methods for resolving a handover failure, when a cell is off during handover.

FIG. 10 illustrates one of methods for resolving a handover failure, when a cell is powered off during handover.

A network illustrated in FIG. 10 includes an SeNB, a UE serviced by the SeNB, and a TeNB to which the UE may perform handover. While only one UE is shown in FIG. 10, methods described below may also apply to a plurality of UEs. A cell managed by the TeNB is defined as a target cell and a cell managed by the SeNB is defined as a source cell.

If the TeNB determines to power off the target cell, it is difficult for a UE performing handover from the SeNB to the TeNB to know switching of the target cell of the TeNB to an off state. Therefore, the UE may consume power and cause UL interference with a neighbor cell by continuing to transmit a Random Access Preamble to the powered-off TeNB.

If the TeNB determines power-off of the target cell, it is efficient for the TeNB not to admit a UE that is to perform handover to the target cell. When the TeNB is to power off the target cell, the TeNB should control a UE that has already performed handover to the target cell to perform handover to another cell again. If the UE (e.g. a fast UE) does not have time enough to perform handover to another cell, a Radio Link Failure (RLF) may occur to the UE.

Accordingly, if the TeNB determines power-off of the target cell, the TeNB needs to command a UE performing handover to the TeNB to discontinue the handover, in real time. That is, the UE may discontinue the handover to the TeNB by Cell Off Indication information/message.

Referring to FIG. 10, as a UE moves or the source cell of the SeNB is powered off, the UE may need to perform handover to the TeNB. The UE and/or the SeNB may initiate a handover procedure (S1010).

In step S1010, the UE and/or the SeNB may determine a TeNB for handover and initiate handover to the TeNB.

However, after the handover is determined, the TeNB may determine power-off, taking into account a network load state for ES and/or interference cancellation (S1020).

The TeNB may transmit Cell Off Indication information or a Cell Off Indication message indicating that the TeNB will power off the target cell to the UE and/or the SeNB (S1030a and S1030b).

Upon receipt of the Cell Off Indication information or Cell Off Indication message, the SeNB may transmit the received Cell Off Indication information or Cell Off Indication message to UEs managed by the SeNB. The Cell Off Indication information may be transmitted by RRC signaling (S1040).

Upon receipt of the Cell Off Indication information or Cell Off Indication message, the UE may discontinue the handover procedure, thereby preventing a handover failure (S1050). That is, the UE may perform handover to another eNB without performing the handover procedure illustrated in FIG. 7 or the RACH procedure illustrated in FIGS. 8 and 9.

For example, if the UE is not detached from the cell of the SeNB, the SeNB may determine handover of the UE to another TeNB based on channel measurements reported by the UE and indicate the handover decision to the UE, so that the UE may perform handover to another TeNB. If the UE is detached from the cell of the SeNB, the UE may perform an attach procedure to the SeNB again.

With reference to FIG. 10, methods for determining power-off of a target cell by a TeNB have been described above. In another aspect of the present invention, an SeNB may determine cell-off of a TeNB, taking into account a network load state. In this case, the SeNB may transmit Cell Off Indication information/message to the TeNB and/or the UE.

Methods for transmitting Cell Off Indication/message during handover will be described below in detail.

3.1 Method for Indicating Cell Off During Handover Preparation

Figure 11:
FIG. 11 illustrates a case of handover failure in a handover preparation procedure.

FIG. 11 illustrates a case of handover failure during handover preparation.

If an SeNB initiates handover, the SeNB may transmit a HANDOVER REQUEST message to a TeNB (S1110).

If the TeNB may not establish a radio bearer or a handover failure occurs during handover preparation, the TeNB may transmit a HANDOVER PREPARATION FAILURE message to the SeNB (S1120).

If the TeNB may not establish a radio bearer or a handover failure occurs, due to cell-off of the TeNB, the TeNB may transmit Cell Off Indication information/message in the HANDOVER PREPARATION FAILURE message to the SeNB.

For example, when the TeNB determining power-off receives the HANDOVER REQUEST message from the SeNB (S1110), the TeNB may set Cell Off Indication Information (e.g., Switch Off Ongoing) in a Radio Network Layer Cause IE and transmit it to the SeNB via an X2 interface (S1120).

3.2 Method for Indicating Cell Off by Handover Cancellation

Figure 12:
FIG. 12 illustrates an exemplary handover cancel procedure.

FIG. 12 illustrates an exemplary handover cancel procedure.

In an LTE/LTE-A system, a Handover Cancel message is generally transmitted to cancel ongoing handover from an SeNB to a TeNB.

However, if a TeNB determines to power off its target cell, the TeNB may transmit a Handover Cancel message to an SeNB in an embodiment of the present invention. That is, as the target cell is powered off, the TeNB as well as the SeNB may transmit the Handover Cancel message via an X2 interface.

Referring to FIG. 12, when the TeNB powers off the target cell, the TeNB transmits the Handover Cancel message to the SeNB to cancel the ongoing handover procedure. Herein, the Handover Cancel message may include Cell Off Indication information (S1210).

Upon receipt of the Handover Cancel message from the TeNB in step S1210, the SeNB may transmit the Cell Off Indication information to a UE performing the handover by a MAC signal or an RRC signal, so that the UE may discontinue the handover procedure. That is, these messages may include information about a message type and a cell ID of the TeNB. Upon receipt of the MAC/RRC signal, the UE does not perform the handover any longer. The SeNB may determine handover of the UE to another TeNB based on channel measurements reported by the UE and may command handover to another TeNB to the UE by indicating the handover decision to the UE.

3.3 Cell Off Indication through Random Access Response (RAR) Message

If a UE has not received an RAR message from a TeNB after transmitting a Random Access Preamble to the TeNB, the UE continues to transmit the Random Access Preamble until the number of transmissions of the Random Access Preamble PREAMBLE_TRANSMISSION_COUNTER is equal to a predetermined maximum value, preambleTransMax. That is, the UE may transmit the Random Access Preamble as many times as preambleTransMax.

If the TeNB determines to power off the target cell, it is difficult for a UE that is performing a handover procedure from the SeNB to the TeNB to know that the TeNB has switched to an off state and thus may continue to transmit a Random Access preamble to the TeNB. Particularly, a cell-edge UE should transmit a Random Access Preamble with high power, which may interfere with a neighbor cell that is using the same resources at the same time point.

Now, a description will be given of various methods for transmitting Cell Off Indication information/message by an RAR message to a UE so that the UE may not transmit a Random Access Preamble repeatedly.

3.3.1 RAR Message

Hereinafter, the RAR message which can be used in the embodiments of the present application is described.

Figure 13:
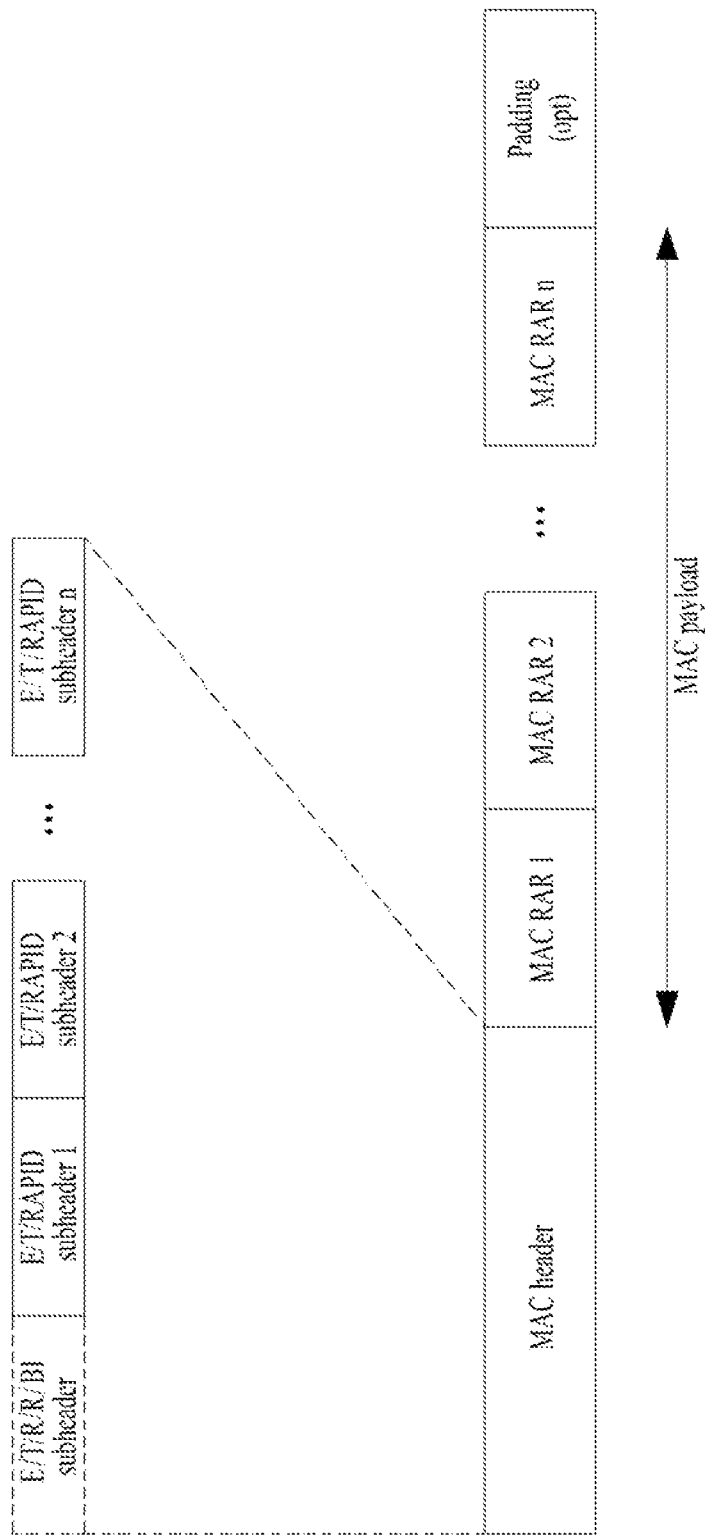
FIG. 13 illustrates an example of MAC PDU for the RAR.

FIG. 13 illustrates an example of MAC PDU for the RAR.

Referring to FIG. 13, a MAC header includes one or more MAC subheaders. Each MAC subheader corresponds to a MAC RAR excepting for the Backoff Indicator subheader. If the Backoff Indicator subheader is included, the Backoff Indicator subheader is only included once and is the first subheader included within the MAC header. In this case, the MAC PDU includes the MAC header and zero or more MAC RARs. In addition, optionally, padding may occur after the last MAC RAR.

Figure 14:
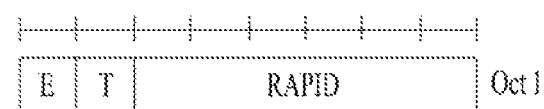
FIG. 14 illustrates examples of MAC subheaders for the RAR and the MAC RAR.
Figure 14:
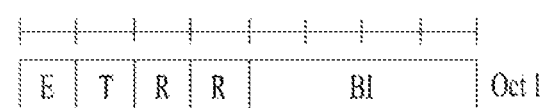
Figure 14:
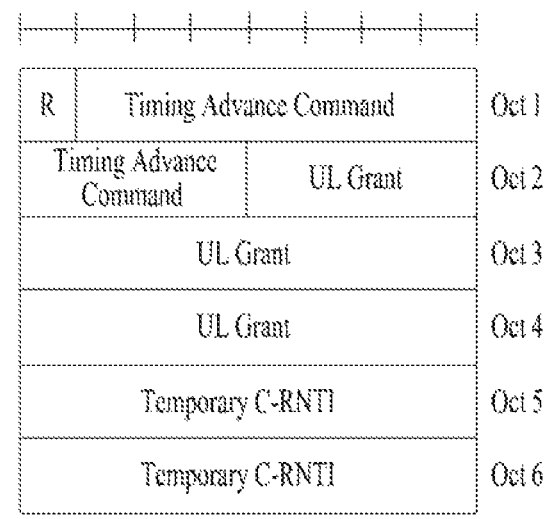

FIG. 14 illustrates examples of MAC subheaders for the RAR and the MAC RAR.

The MAC subheader of the present application is of variable size and consists of following fields.

- A Extension (E) field is a flag indicating if more fields are present in the MAC header or not. The E field is set to "1" to indicate at least another set of E/T/RAPID fields follows. The E field is set to "0" to indicate that a MAC RAR or padding starts at the next byte.
- A Type (T) field is a flag indicating whether the MAC subheader contains a Random Access Identifier (ID) or a Backoff Indicator. The T field is set to "0" to indicate the presence of a Backoff Indicator (BI) field in the subheader. The T field is set to "1" to indicate the presence of a Random Access Preamble ID (RAPID) field in the subheader;
- A Reserved (R) field is a reserved bit, set to "0",
- A Backoff Indicator (BI) field identifies the overload condition in the cell. The size of the BI field is 4 bits.
- A Random Access Preamble IDentifier (RAPID) field identifies the transmitted Random Access Preamble (see section 1.5). The size of the RAPID field is 6 bits.

The Backoff Indicator file values are presented in Table 1 as following.

TABLE 1

| Index | Backoff Parameter value (ms) |
| --- | --- |
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

Referring to FIG. 14 (a), a MAC subheader consists of the three header fields E/T/RAPID but for the Backoff Indicator subheader which consists of the five header field E/T/R/R/BI (i.e., FIG. 14 (b)).

The MAC RAR of the present application is of fixed size and consists of the following fields.

- A Reserved (R) field is a reserved bit, set to "0".
- A Timing Advance Command field indicates the index value of TA (e.g., 0, 1, 2 . . . 1282) used to control the amount of timing adjustment that UE has to apply (see section 1.5). The size of the Timing Advance Command field is 11 bits.
- An UL Grant field indicates the resources to be used on the uplink. The size of the UL Grant field is 20 bits.
- A Temporary C-RNTI field indicates the temporary identity that is used by the UE during Random Access procedure. The size of the Temporary C-RNTI field is 16 bits.

Padding may occur after the last MAC RAR. Presence and length of padding is implicit based on TB size, size of MAC header and number of RARs.

Referring to FIG. 14 (c), a MAC RAR consists of the four fields, such as the R/Timing Advance Command/UL Grant/Temporary C-RNTI fields.

3.3.2 Method for Transmitting Cell Off Indication Information in BI Field of RAR Message When a TeNB determines to power off a target cell, the TeNB, which has receives a Random Access Preamble, may transmit Cell Off Indication information in a Backoff Indicator (BI) field of an RAR message to a UE that is to perform handover to the target cell. For example, referring to [Table 1] of Clause 3.3.1, 4-bit BI index, 13, 14, or 15 has a reserved value. Accordingly, the TeNB may set the reserved BI indexes 13, 14, or 15 as Cell Off Indication information.

Referring to FIG. 8, a UE transmits a Random Access Preamble to a TeNB (S810). Then the UE may receive an RAR message including a BI field indicating cell-off (i.e., a BI set to 13, 14, or 15) within an RA response window that lasts a predetermined time (S820). If the BI field of the RAR message indicates cell-off, the UE discontinues the random access procedure for handover. That is, the UE discontinues the RACH procedure without transmitting the Random Access Preamble again to the TeNB. For example, the UE may not transmit an RRC Connection Request message or an RRC Connection Reconfiguration Complete message on a Common Control Channel (CCCH). In addition, the UE may perform an attach procedure to a SeNB again.

3.3.3 Method for Transmitting Cell Off Indication Information in MAC Header and/or MAC Payload of RAR Message If a TeNB determines to power off a target cell and then receives a Random Access Preamble from a UE that wants handover to the target cell, the TeNB may transmit Cell Off Indication information in a MAC header and/or MAC payload to the UE. For example, the TeNB may transmit the Cell Off Indication information in a Reserved (R) field of the MAC header or the MAC payload.

That is, the TeNB may transmit Cell Off Indication information indicating power-off of the target cell of the TeNB by setting the R field to "1" in the MAC header or the MAC payload (refer to Clause 3.3.1).

For example, if the UE that has transmitted the Random Access Preamble to the TeNB receives an RAR message with an R field set to "1" in a MAC header or MAC payload, the UE may discontinue an ongoing random access procedure, determining that the target cell of the TeNB will be powered off. Thus, the UE does not retransmit the Random Access Preamble and discontinues the RACH procedure. Accordingly, the UE does not transmit an RRC Connection Request message or an RRC Connection Reconfiguration Complete message on a CCCH. In addition, the UE may perform an attach procedure to an SeNB again.

Referring to FIG. 8, upon receipt of an RAR message with an R field set to "1" in a MAC header or MAC payload in step S820, the UE discontinues the RACH procedure, not performing steps S830 and S840.

3.3.4 Method for Transmitting Cell Off Indication Information in UL Grant Field of RAR Message A CSI request field of a UL grant included in a MAC RAR message is used to request CSI in a non-contention-based random access procedure. In the case of a contention-based random access procedure, the CSI request field is set as a reserved bit.

Therefore, a TeNB may transmit Cell Off Indication information in a CSI field of a UL grant field in the contention-based random access procedure with a UE. For example, if the CSI request bit of the UL Grant field is set to "0", this may mean continuation of an RACH procedure. If the CSI request bit of the UL Grant field is set to "1", this may mean discontinuation of an RACH procedure due to power-off of a target cell. That is, if the TeNB receives a Random Access Preamble from a UE, the TeNB may transmit Cell Off Indication information in a CSI request field included in a UL grant field of an RAR message.

If the UE receives an RAR message with a CSI request field set to '0' in step S820, the UE continues the RACH procedure for handover. That is, the UE transmits an RRC Connection Request message in a PUSCH area allocated by a UL Grant, or if an RRC connection reconfiguration procedure has been completed, the UE transmits an RRC Connection Reconfiguration message. For the subsequent RACH procedure, refer to the description of FIG. 8.

If the UE receives an RAR message with a CSI request field set to '1' in step S820, the UE determines that the target cell of the TeNB has been powered off. Therefore, the UE does not perform the subsequent RACH procedure with the TeNB. That is, the UE does not transmit an RRC Connection Request message or an RRC Connection Reconfiguration message to the TeNB. In addition, the UE may perform an attach procedure to an SeNB.

3.4. Cell Off Indication by Contention Resolution Message

A UE, which performs an RACH procedure, transmits an RRC Connection Request message or an RRC Connection Reconfiguration Complete message as a third message to a TeNB (refer to step S830 in FIG. 8). Upon successful receipt of the third message, the TeNB transmits a Contention Resolution message as a fourth message for contention resolution to the UE (refer to step S840). Thus, the TeNB may indicate to the UE that UEs performing the RACH procedure may be distinguished from each other by Random Access Premables.

Methods for transmitting Cell Off Indication information to a UE and/or an SeNB by a Contention Resolution message will be described below.

3.4.1 Contention Resolution Message

Contention Resolution is based on either C-RNTI on PDCCH of a PCell (Primary Cell) or UE Contention Resolution Identity on DL-SCH. When checking whether contention resolution was successful a UE considers the MAC header structure for the processing of a MAC PDU containing a UE Contention Resolution Identity MAC control element. More detail description of the contention resolution message can be referred to section 5.1.5 of 3GPP TS 36.321 V11.2 document. The Contention resolution message is transmitted as a MAC PDU.

The MAC header for DL-SCH which carries the Contention Resolution message is of variable size and consists of the following fields.

A Logical Channel ID (LCID) field identifies the logical channel instance of the corresponding MAC SDU or the type of the corresponding MAC control element or padding as described in following table 2, table 3 and table 5 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits.

A Length (L) field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

A Format (F) field indicates the size of the Length field as indicated in table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

An Extension (E) field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

A Reserved (R) bit, set to "0".

TABLE 2

| Index | LCID values |
| --- | --- |
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

TABLE 3

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE 4

| Index | Size of Length field (in bits) |
| --- | --- |
| 0 | 7 |
| 1 | 15 |

TABLE 5

| Index | LCID values |
| --- | --- |
| 00000 | MCCH (see note) |
| 00001-11100 | MTCH |
| 11101 | Reserved |
| 11110 | MCH Scheduling Information |
| 11111 | Padding |

NOTE:
If there is no MCCH on MCH, an MTCH could use this value.

3.4.1 Method for Transmitting Cell Off Indication Information in MAC Header of Contention Resolution Message-1

If a TeNB determines to power off its cell, a target cell while performing handover with a UE, the TeNB may transmit Cell Off Indication information in a MAC header of a MAC PDU including a Contention Resolution message to the UE.

Basically, a MAC header including a Contention Resolution message includes an LCID field (refer to [Table 2]) set to '11100'. However, when Cell Off Indication information is transmitted, the LCID field included in the MAC header used for the Contention Resolution message may be newly defined. For example, one of reserved values of the LCID field, ranging from '01011' to '11010' may be newly defined as Cell Off Indication information.

This will be described with reference to FIG. 8. After the TeNB successfully receives an RRC Connection Request message or an RRC Connection Reconfiguration Complete message in step S830 in FIG. 8, the TeNB may set an LCID field to not '11100' but '01011' in a MAC header of a Contention Resolution message to indicate that the target cell is powered off.

Upon receipt of the Contention Resolution message with the LCID field set to '01011' in step S840, the UE may recognize that the target cell is powered off. Therefore, the UE discontinues the random access procedure to the TeNB and does not retransmit a Random Access Preamble. In addition, the UE may perform an attach procedure to an SeNB again.

3.4.2 Method for Transmitting Cell Off Indication Information in MAC Header of Contention Resolution Message-2

Clause 3.4.1 describes the method for using an LCID field of a MAC header. Now a description will be given of a method for using an R field of a MAC header.

If a TeNB determines to power off its cell, a target cell and receives an RRC Connection Request message or RRC Connection Reconfiguration Complete message for handover from a UE, the TeNB may indicate cell-off by setting the R filed of a MAC header of a Contention Resolution message to '1'.

After transmitting the RRC Connection Request message or RRC Connection Reconfiguration Complete message to the TeNB, the UE activates a contention resolution timer ContentionResolutionTimer set to a predetermined value. Before expiration of the contention resolution timer, the UE may receive the Contention Resolution message from the eNB. If the R field of the MAC header of the Contention Resolution message is set to '1', the UE discontinues a random access procedure to the TeNB. That is, the UE does not retransmit a Random Access Preamble to the TeNB. In addition, the UE may perform an attach procedure to an SeNB again.

3.4.3 Method for Transmitting Cell Off Indication Information by Combination of MAC Header and MAC Payload of Contention Resolution Message If a TeNB determines to power off its cell, a target cell, the TeNB may transmit Cell Off Indication information using an LCID field of a MAC header and a UE contention resolution ID of MAC payload in a Contention Resolution message. For example, the LCID field may be set to '11100' indicating UE contention resolution and the UE contention resolution ID may be set to '0000', to thereby indicate cell-off.

After transmitting an RRC Connection Request message or RRC Connection Reconfiguration Complete message to the TeNB, a UE activates a contention resolution timer ContentionResolutionTimer set to a predetermined value. Before expiration of the contention resolution timer, the UE may receive the Contention Resolution message from the eNB. If the LCID field of the MAC header of the Contention Resolution message is set to '11100' and the UE contention resolution ID field of the MAC payload of the Contention Resolution message is set to '0000', the UE may be aware of power-off of the target cell of the TeNB. Therefore, the UE discontinues a random access procedure to the TeNB. That is, the UE does not retransmit a Random Access Preamble to the TeNB. In addition, the UE may perform an attach procedure to an SeNB again.

The methods described in Clause 3.1 to Clause 3.4 may be performed in step S1030a or S1030b of FIG. 10.

4. Implementation Apparatus

Figure 15:
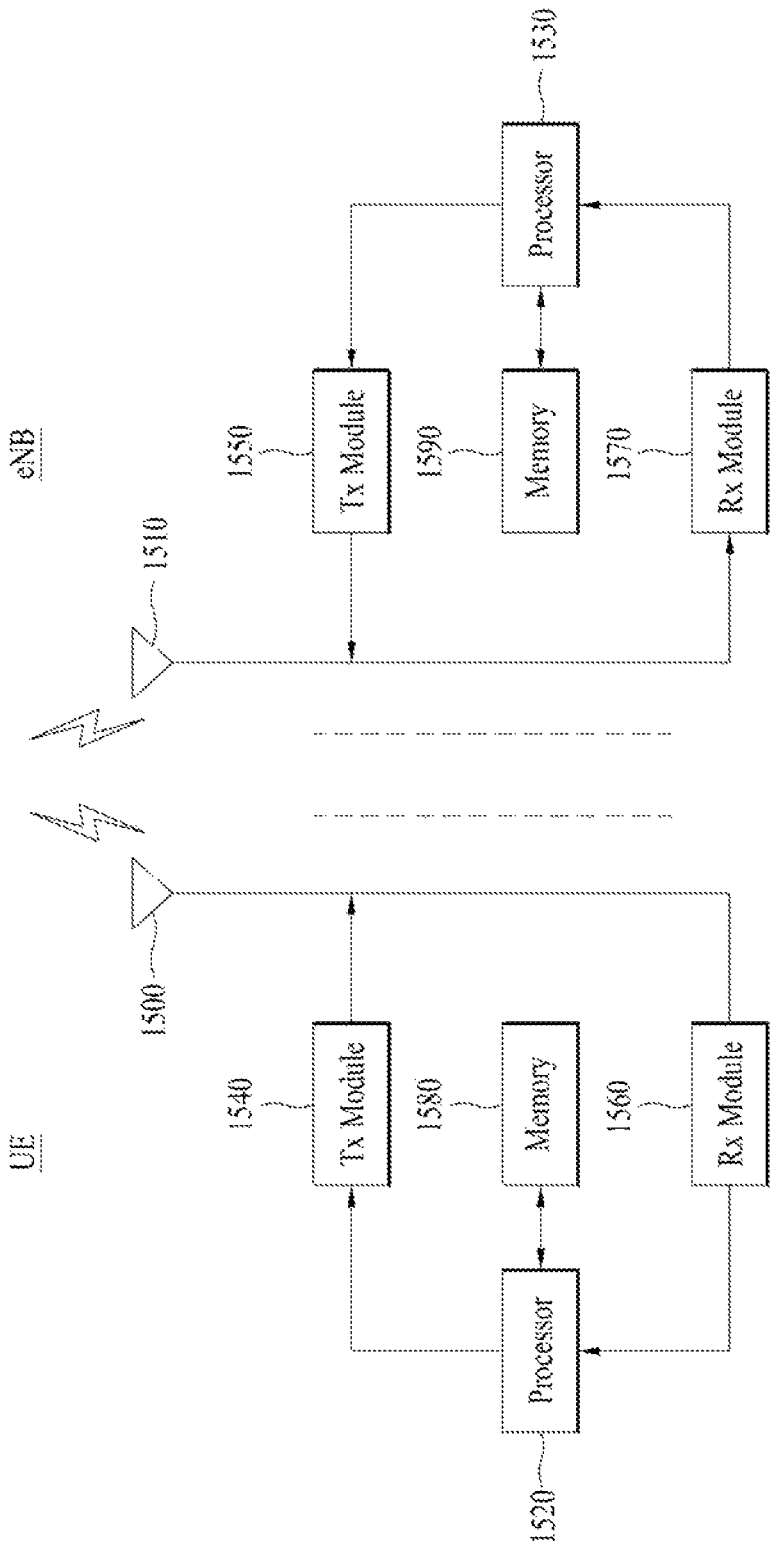
FIG. 15 is a block diagram of apparatuses that may perform the methods illustrated in FIGS. 1 to 14.

The apparatus described with reference to FIG. 15 can implement the methods described in FIGS. 1 to 14.

A UE may operate as a transmitter in uplink and operate as a receiver in downlink. In addition, a BS (eNB) may operate as a receiver in uplink and operate as a transmitter in downlink.

That is, the UE and the BS may respectively include transmitter 1540 and 1550 and receiver 1560 and 1570, in order to control transmission and reception of information, data and/or message. The UE and the BS may include antennas 1500 and 1510 for transmitting/receiving information, data and/or messages, respectively.

The UE and the BS may include processors 1520 and 1530 for performing the above-described embodiments of the present invention and memories 1580 and 1590 for temporarily or permanently storing processing procedures of the processors, respectively.

The embodiments of the present invention may be implemented using the above-described components and functions of the UE and the BS. The processor of the UE and/or the BS may transmit/receive Cell Off Indication information using the methods described in Clause 1 to Clause 3 alone or in combination.

In embodiments of the present invention, while a source cell and a target cell refer to predetermined frequency areas and/or geographical areas managed by eNBs, they may be used in the same sense as eNBs.

The transmitter and the receiver included in the UE and the BS may perform a packet modulation/demodulation function for data transmission, a high-speed packet channel coding function, an orthogonal frequency division multiple access (OFDMA) packet scheduling function, a time division duplexing (TDD) packet scheduling function and/or a channel multiplexing function. The UE and the BS of FIG. 15 may further include a low-power radio frequency (RF)/Intermediate frequency (IF) module.

Meanwhile, in the present invention, as a UE, a personal digital assistant (PDA), a cellular phone, a personal communication service (PCS) phone, a global system for mobile (GSM) phone, a wideband CDMA (WCDMA) phone, a mobile broadband system (MBS) phone, a handheld personal computer (PC), a laptop, a smart phone or a multi mode-multi band (MM-MB) terminal may be used.

The smart phone refers to a terminal which has merits of a mobile communication terminal and a PDA and includes a data communication function of the PDA, such as scheduling, fax transmission/reception and Internet access, as well as the functions of the mobile communication terminal. In addition, the MM-MB terminal refers to a terminal which may include a multi-modem chip and operate in a portable Internet system and other mobile communication systems (e.g., a Code Division Multiple Access (CDMA) 2000 system, a Wideband CDMA (WCDMA) system, etc.).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in the memory units 1580 and 1590 so that it can be driven by the processors 1520 and 1530. The memory units are located inside or outside of the processors, so that it can communicate with the aforementioned processor via a variety of well-known parts.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The present invention is applicable to various wireless access systems. Examples of the various wireless access systems include a 3rd Generation Partnership Project (3GPP) system, a 3GPP2 system and/or an Institute of Electrical and Electronic Engineers (IEEE) 802.xx system. The embodiments of the present invention are applicable to all technical fields using the various wireless access systems in addition to the various wireless access systems.

What is claimed is:

1. A method for preventing a handover failure in a wireless access system supporting cell-on/off, the method comprising:
   initiating, by a user equipment (UE), a handover procedure by transmitting a random access preamble to a target Base Station (BS);
   receiving, by the UE, cell off indication information indicating that a cell of the target BS will be powered off during the handover procedure; and
   discontinuing, by the EU, the handover procedure according to the cell off indication information.

2. The method according to claim 1, wherein the cell off indication information is indicated by a backoff indicator field included in a Medium Access Control (MAC) header of a random access response message transmitted by the target BS.

3. The method according to claim 1, wherein the cell off indication information is indicated by one of a reserved field included in a MAC header and a reserved field included in MAC payload of a random access response message transmitted by the target BS.

4. The method according to claim 1, wherein the cell off indication information is indicated by a channel state information request field included in an uplink grant of MAC payload of a random access response message transmitted by the target BS.

5. The method according to claim 1, wherein the cell off indication information is indicated by at least one of a logical channel identifier included in a header of a contention resolution message transmitted by the target BS and a UE contention resolution identifier included in payload of the contention resolution message.

6. The method according to claim 1, wherein the cell off indication information is indicated by a reserved field included in a header of a contention resolution message transmitted by the target BS and a reserved field included in payload of the contention resolution message.

7. The method according to claim 1, wherein the target BS transmits the cell off indication information to a source BS and the source BS transmits the cell off indication information by higher layer signaling.

8. A User Equipment (UE) for preventing a handover failure in a wireless access system supporting cell-on/off, the UE comprising:
   a receiver;
   a transmitter; and
   a processor configured to support prevention of a handoff failure,
   wherein the processor is configured to control the transmitter and the receiver, the processor configured to:
      initiate a handover procedure by transmitting a random access preamble to a target Base Station (BS),
      receive cell off indication information indicating that a c ell of the target BS will be powered off by controlling the receiver during the handover procedure, and
      discontinue the handover procedure according to the cell off indication information.

9. The UE according to claim 8, wherein the cell off indication information is indicated by a backoff indicator field included in a Medium Access Control (MAC) header of a random access response message transmitted by the target BS.

10. The UE according to claim 8, wherein the cell off indication information is indicated by one of a reserved field included in a MAC header and a reserved field included in MAC payload of a random access response message transmitted by the target BS.

11. The UE according to claim 8, wherein the cell off indication information is indicated by a channel state information request field included in an uplink grant of MAC payload of a random access response message transmitted by the target BS.

12. The UE according to claim 8, wherein the cell off indication information is indicated by at least one of a logical channel identifier included in a header of a contention resolution message transmitted by the target BS and a UE contention resolution identifier included in payload of the contention resolution message.

13. The UE according to claim 8, wherein the cell off indication information is indicated by a reserved field included in a header of a contention resolution message transmitted by the target BS and a reserved field included in payload of the contention resolution message.

14. The method according to claim 8, wherein the cell off indication information is received from a source BS by higher layer signaling.

* * * * *